United States Patent
Bonomi (10) Patent No.: US 9,366,382 B2
(45) Date of Patent: Jun. 14, 2016

(54) REGULATION AND/OR LOCKING DEVICE FOR A PLATE

(71) Applicant: METALGLAS BONOMI S.r.l., Lumezzane, Brescia (IT)

(72) Inventor: Giordano Bonomi, Brescia (IT)

(73) Assignee: METALGLAS BONOMI S.r.l., Lumezzane, Brescia (IT)

( * ) Notice: Subject to any disclaimer, the term of this patent is extended or adjusted under 35 U.S.C. 154(b) by 21 days.

(21) Appl. No.: 14/377,353

(22) PCT Filed: Feb. 7, 2013

(86) PCT No.: PCT/IB2013/051027
§ 371 (c)(1),
(2) Date: Aug. 7, 2014

(87) PCT Pub. No.: WO2013/121330
PCT Pub. Date: Aug. 22, 2013

(65) Prior Publication Data
US 2015/0330562 A1    Nov. 19, 2015

(30) Foreign Application Priority Data

Feb. 14, 2012 (IT) .............................. BS2012A0020

(51) Int. Cl.
*F16M 13/00* (2006.01)
*F16M 13/02* (2006.01)
*E04F 11/18* (2006.01)

(52) U.S. Cl.
CPC .......... *F16M 13/022* (2013.01); *E04F 11/1853* (2013.01); *E04F 2011/1895* (2013.01)

(58) Field of Classification Search
CPC ............... F16M 13/022; E04F 11/1853; E04F 2011/1895
USPC ................ 248/558; 52/238.1, 127.8, 127.11, 52/127.12, 239, 240, 241, 242, 243, 243.1, 52/210, 213, 217, 204.5, 204.56, 204.72, 52/204.71, 800.16, 800.18, 800.15
See application file for complete search history.

(56) References Cited

U.S. PATENT DOCUMENTS 2,169,713 A * 8/1939 Stroud ...................... E06B 3/64
                                                   49/489.1
4,103,874 A * 8/1978 Horgan, Jr. ......... E04F 11/1851
                                                   256/24

(Continued)

FOREIGN PATENT DOCUMENTS

NZ         530178      8/2006
WO    WO 2009/017873 A1   2/2009

OTHER PUBLICATIONS

International Search Report for corresponding International Patent Application No. PCT/2013/051027 mailed Oct. 31, 2013.

*Primary Examiner* — Mark Wendell
(74) *Attorney, Agent, or Firm* — Merchant & Gould P.C.

(57) ABSTRACT

A regulation and/or locking device (1) of a plate (100) is suitable for cooperating with one of its sides (101, 102) so as to lock it in a predefined position. The device (1) has two gibs (10) facing one another, where each gib (10) has a support surface (11), positioned towards the outside and suitable for resting on the respective face (101, 102) of the plate or on a fixed element, and positioning surfaces (12), inclined with respect to the support surfaces (11). The device also includes positioners (50) interacting with the positioning surfaces (12) in such a way as to move the position of the gibs (10) locking the plate (100) and controllers (60) maneuverable to activate the positioners (50).

13 Claims, 5 Drawing Sheets

(56) References Cited

U.S. PATENT DOCUMENTS

| | | | | |
|---|---|---|---|---|
| 4,423,582 A * | 1/1984 | Yates | E06B 3/5864 | 52/766 |
| 4,671,016 A * | 6/1987 | Boeckx | E06B 3/5454 | 49/388 |
| 4,680,903 A * | 7/1987 | Horgan, Jr. | E04C 2/384 | 24/524 |
| 4,763,453 A * | 8/1988 | Horgan, Jr. | E04C 2/384 | 24/524 |
| 4,837,993 A * | 6/1989 | Studenski | E06B 3/02 | 52/208 |
| 4,920,717 A * | 5/1990 | Hooper, Jr. | E04F 11/1851 | 256/24 |
| 5,069,010 A * | 12/1991 | Trainor, Jr. | E06B 3/02 | 52/127.8 |
| 5,205,099 A * | 4/1993 | Grunhage | E06B 5/165 | 52/204.5 |
| 5,239,778 A * | 8/1993 | Towler | E05D 15/30 | 16/58 |
| 5,275,074 A * | 1/1994 | Taylor | B23Q 1/28 | 403/297 |
| 5,339,583 A * | 8/1994 | Hrdlicka | E06B 3/302 | 156/293 |
| 6,419,209 B1 * | 7/2002 | Shepherd | E04F 11/1851 | 256/24 |
| 6,434,905 B1 * | 8/2002 | Sprague | E06B 3/02 | 49/501 |
| 6,517,056 B2 * | 2/2003 | Shepherd | E04F 11/1851 | 256/24 |
| 6,543,956 B2 * | 4/2003 | Schwarzbich | F16B 5/0233 | 403/167 |
| 7,272,913 B2 * | 9/2007 | Mitchell | E04F 13/0826 | 52/235 |
| 7,380,378 B2 * | 6/2008 | Clifford | E06B 3/02 | 52/127.8 |
| 7,434,790 B1 * | 10/2008 | Hansen | E04F 11/1851 | 256/19 |
| 7,454,867 B2 * | 11/2008 | Nicoletti | E04B 2/7453 | 52/238.1 |
| 7,584,588 B2 * | 9/2009 | Kim | E06B 3/5864 | 52/204.597 |
| 7,624,549 B2 * | 12/2009 | Kopish | E04B 2/82 | 52/242 |
| 8,015,766 B2 * | 9/2011 | Gosling | E04B 2/7455 | 52/239 |
| 8,181,405 B2 * | 5/2012 | Nash | E04F 11/1851 | 52/127.8 |
| 8,327,591 B2 * | 12/2012 | Wilkinson, Jr. | G09F 7/18 | 52/238.1 |
| 8,826,621 B2 * | 9/2014 | Noble | E04F 11/1851 | 52/584.1 |
| 9,127,474 B2 * | 9/2015 | Tinwala | E04H 17/16 | |
| 2003/0024182 A1 * | 2/2003 | Yeany | E06B 1/30 | 52/204.67 |
| 2006/0070318 A1 | 4/2006 | Chen et al. | | |
| 2009/0241445 A1 * | 10/2009 | Sprague | E04B 2/827 | 52/243.1 |
| 2010/0205880 A1 | 8/2010 | Lin | | |

* cited by examiner

REGULATION AND/OR LOCKING DEVICE FOR A PLATE

This application is a National Stage Application of PCT/IB2013/051027, filed 7 Feb. 2013, which claims benefit of Serial No. BS2012A000020, filed 14 Feb. 2012 in Italy and which applications are incorporated herein by reference. To the extent appropriate, a claim of priority is made to each of the above disclosed applications.

BACKGROUND OF THE INVENTION

The present invention concerns a regulation and/or locking device for a plate and a support for supporting a plate comprising said device; more specifically, said devices are also suitable for permitting a regulation of the position of the plate.

Contemporary architecture has increasingly turned to the use of elements which, aesthetically, create a sense of continuity.

In particular, the use has constantly grown of plates for which continuity is obtainable by means of particularly extended dimensions.

In order to exploit said aesthetic continuity and at the same time seek luminosity and related light effects, transparent plates are used, e.g. of glass or the like.

It is nevertheless clear that with the increase in size of said plates, there is also an increase in the difficulty of their positioning and in maintaining such predefined position.

Devices for locking, and regulating, a plate element are already known in the sectors of the art.

Nevertheless, together with an increase in the dimensions of the plates, the dimensions of said devices also increase. Such effect is however undesired inasmuch as it has a negative impact on the aesthetics of such installations, negatively affecting the sought taste for continuity.

In other words, although the plates are requested in increasingly larger dimensions, the devices that have to support them have to have increasingly smaller dimensions, and must be as less invasive as possible.

In known art however, to a miniaturization of such devices corresponds less versatility of same; more specifically, the miniaturization of the devices affects the possibility of regulating the installed plates, even more so as their dimensions increase.

In some sectors of the art, the need is in fact particularly felt to regulate the inclination of the plates at the time of installation, and once these have been placed in such position, to keep them as firmly as possible in such position over the years.

Furthermore, plates of all types and materials are normally used and the device is therefore also required to be extremely versatile and able to adapt to the plate to be locked and regulated.

SUMMARY OF THE INVENTION

Object of the present invention is to provide a plate regulating and/or locking device suitable for catering in the best possible way to the typical needs of the state of the art and to provide a support suitable for containing said device.

More specifically, the plate regulation and/or locking device forming the subject of the present invention is of reduced dimensions and suitable for performing the locking and/or regulation of plates of considerable dimensions.

BRIEF DESCRIPTION OF THE DRAWINGS

The characteristics and the advantages of the device and of the support comprising it, in accordance with the present invention, will be evident from the description provided below, by way of non-limitative example, in agreement with the attached illustrations, wherein:

the FIG. 1 shows an axonometric schematic view of one embodiment of the plate regulation and/or locking device forming the subject of the present invention;

the FIGS. 1a, 1b, 1c and 1d show axonometric schematic views of a number of locking and/or regulation device components, in particular of a gib, of a wedge element and of a threaded pin, in agreement with a preferred embodiment, and of a generic plate;

the FIG. 2 shows a section view of a support, like that forming the subject of the present invention, in an alternative embodiment, in a banister configuration;

the FIGS. 2a and 2b show two section views respectively of a support, like that forming the subject of the present invention, in an alternative embodiment, in a banister configuration, wherein the plate is regulated in two inclined positions;

the FIG. 3 shows a section view of a support, like that forming the subject of the present invention, in yet another alternative embodiment, in a banister configuration;

the FIG. 4 shows a section view of a support, like that forming the subject of the present invention, in yet another alternative embodiment, in a projecting roof or canopy configuration.

DETAILED DESCRIPTION OF THE PREFERRED EMBODIMENT

With reference to the attached illustrations by 1 is indicated a plate regulation/locking device, subject of the present invention according to a preferred embodiment.

A plate is indicated by 100. By plate is meant an element having two preponderant dimensions; in particular the plates have a considerably lower thickness compared to height and length. On the plate 100 two opposite faces 101, 102 can be identified, the thickness of the plate is the distance between said faces 101, 102. Furthermore, along the height, two extremities can be identified: one upper extremity 105 and one lower extremity 104 preferably called plate foot 104.

The regulation and/or locking device 1 forming the subject of the present invention is suitable for cooperating with the plate 100, preferably cooperating with one of its faces 101, 102.

In a preferred embodiment, the device 1 cooperates with the plate 100 to regulate it and lock it in a predefined position, maintained over time by the device 1.

Furthermore, in a preferred embodiment, the device 1 is suitable for cooperating with another of its portions with a fixed element which acts as a locator, e.g., a portion of wall, or the inner wall of a crack in a floor, wherein the plate 100 can be housed.

Consequently, in such configuration, the device 1 is positioned between the plate 100 and a generic part of said fixed element facing the plate 100.

In a further embodiment, the device 1 is suitable for cooperating with one of its portions with the above-mentioned plate 100 and with another of its portions with another plate 100. In such configuration, the device 1 is positioned between two facing plates 100.

In a preferred embodiment, the device 1 comprises at least one gib 10 and means for positioning the gib 50.

Preferably, the gib 10 comprises at least one rest surface 11 and at least one positioning surface 12.

In a preferred embodiment, the gib 10 comprises a support surface 11, positioned towards the outside and suitable for resting on the respective face 101, 102 of the plate 100. Or again, in an alternative preferred embodiment, the support surface 11, positioned towards the outside is suitable for resting on the fixed element.

The support surface 11 is suitable for resting substantially on a face of a plate 101, 102 or on a fixed element, in such a way that the gib 10 positions with the plate 100 in a preferred position.

In a preferred embodiment, the support surface 11 thus replicates the shape of the face 101, 102 or of the fixed element with which it cooperates, in such a way as to completely rest on the plate 100 and this way have a support surface by means of which to interact with the plate 100 itself.

The positioning surface 12 is suitable for interacting with the positioning means 50 in such a way that to a movement of said positioning means 50 corresponds a possible movement from the position of the gib 10.

In particular, in a configuration wherein the gib 10 is resting against a component, e.g., a plate or a fixed element, the interaction with the positioning means 50 results in the gibs 10 transmitting forces to said components.

Depending on the embodiment variations, the gib 10, in cross section, has a polygonal, irregular or regular shape, for example, a parallelogram or trapezoid shape; or again, in a number of embodiment variations, some of the gib faces are arched.

In other words, on the gib in section, two surfaces are identifiable substantially opposite one another: the support surface 11 and a central surface 13.

In a preferred embodiment, the support surface 11 and the central surface 13 extend substantially parallel to one another.

In section, furthermore, at least one positioning surface 12 can be identified, positioned outwards, inclined with respect to the support surface 11.

More specifically, the gib 10 comprises more than one positioning surface 12, preferably two positioning surfaces 12, e.g., at the opposite sides of the gib 10 itself; preferably, the two positioning surfaces 12 are opposite one another; preferably, the two positioning surfaces 12 are at the sides of the support surface 11.

In a preferred embodiment, the positioning means 50 are suitable for interacting with the positioning surface 12.

In particular, said interaction is due to the movement relating to the positioning means 50 with respect to the positioning surfaces 12.

For example, the positioning means 50 interact with the gibs 10, more specifically by means of the positioning surfaces 12, following their movement, to lock the plate; in fact, said interaction causes the movement of the gib 10 itself towards the plate or towards the fixed element respectively.

Preferably, the positioning surface 12 is inclined with respect to the support surface 11 in such a way that, in section, the profile of the gib 10 is reduced following the extension direction of said positioning surface 12 moving away from the support surface 11.

In other words, the positioning surface 12 is inclined with respect to the support surface 11 in such a way as to create a space.

Preferably, the positioning means 50 are suitable for being housed in said spaces and for interacting with the gib 10 starting from said spaces.

This way, a movement of the movement means 50 towards the inside of the spaces, in other words towards the inside of the gib 10, results in this tending to be moved by shifting towards the outside.

Vice versa, with an exiting movement or moving away movement of the movement means 50 from the spaces, moving away from the gib 10, this, if subject to forces, e.g., due to the presence of a plate 100, tends to shift towards the inside.

Furthermore, in a configuration wherein the gib 10 is not subject to forces, to a movement of the movement means 50 away from the spaces, away from the gib 10, corresponds the fact that the gib 10 is free to be moved. This way the plate is free to be moved, in particular rotated, without the device 1 and/or the gib 10 creating any resistance.

In a preferred embodiment, the movement means 50 comprise a wedge element 51 having a shape substantially complementary to the space, i.e., a shape complementary to the inclination of the positioning surface 12 of the gib 10 in such a way as to cooperate with this.

In a preferred embodiment, the wedge element 51 comprises an interaction surface 52 and a control and regulation surface 53.

More specifically, the interaction surface 52 is suitable for interacting with the positioning surface 12 as indicated above.

In a preferred embodiment, the interaction surface 52 has a trend such as to permit a relative translation or rotation of the gib 10, and of its positioning surface 12, with respect to this.

In fact, the interaction surface 52 has at least one inclined surface, or more than one.

In one embodiment variations, the interaction surface 52 is curved in such a way as to not only permit a translation of the gib 10, but also its possible rotation.

In further embodiment variations, the interaction surface 52 has a polygonal trend, comprising one or more planes inclined with respect to one another and suitable for favouring the translation or the rotation of the gib 10.

For example, the interaction surface 52 has a triangular shape.

More specifically, the control and adjustment surface 53 is opposite with respect to the interaction surface 52; moreover, it is suitable for being controlled to regulate the respective wedge element 51 in the respective space.

Preferably, the device 1 comprises command means 60 manoeuvrable to activate the positioning means 50.

The positioning means 60, in a preferred embodiment, move the wedge elements 51 in the respective spaces.

Specifically, the positioning means 50 are adjustable by means of command means 60 specifically suitable for operating on the command and regulation surface 53.

Preferably, the device 1 comprises two gibs 10 facing one another.

In a preferred embodiment, at least one support surface 11, of at least one gib 10, is positioned outwards, and is suitable for resting on the respective face 101, 102 of the plate.

In one embodiment variation, both the support surfaces 11, one for each gib 10, are positioned outwards.

In this configuration comprising two gibs 10, one support surface 11 is suitable for resting on a face 101, 102 of the plate 100 while the other is suitable for resting on a fixed element.

Specifically, the positioning surfaces 12 are in turn positioned outwards and inclined in an opposite direction the one to the other. Preferably, two gibs 10 facing one another have the positioning surfaces 12 inclined in such a way as to create two compartments 5 union of the respective spaces on each gib 10.

Consequently, two edge elements 51 are positioned opposite one another, one in the respective compartment 5.

Preferably, the command and regulation means 60 operate at the same time on both the wedge elements 51.

In one preferred embodiment, the command means 60 are suitable for both operating at the same time on both the wedge elements 51.

By means of the command and regulation means 60, the wedge elements 51 are adjustable and lockable on the gibs 10.

The command means 60 are suitable for reciprocally moving away the wedge elements 51 so these move away from the gibs 10 in such a way that these are, at least in part, free to be positioned, in a predefined position, both with respect to the plate and with respect to themselves, according to need.

For example, this way the plate 100 can be positioned in an inclined position, and locked in said position.

In fact, once the position of the plate 100 has been established, by means of the command and regulation means 60, the two wedge elements 51 are tightened on the gib 10 which, therefore, by applying a force on the plate 100, locks this in such established position.

In a preferred embodiment the gibs are therefore suitable for positioning themselves according to the position of the plate 100. In other words to an inclined position of the plate 100 corresponds a reciprocal positioning of the two gibs 10 in such a way that one gib 10 is inclined so as to maintain contact with the face of the plate 101, 102 while the other stays in contact with the fixed element.

Preferably therefore the gib 10 which cooperates with the fixed element stays in position, while the other gib 10 repositions itself in such a way as to stay in contact with the plate 100.

Operating on the control and regulation means 60 the two gibs 10 apply forces on the plate 100 and on the fixed element respectively so as to lock the plate 100 in said predefined position.

In other words, the two gibs 10 are suitable for repositioning themselves reciprocally according to the inclination of the plate 100.

In a preferred embodiment, the wedge elements comprise through adjustment holes 55.

In a preferred embodiment, the through adjustment holes 55 are threaded.

The control means 60 comprise threaded pins 61, e.g., screws, suitable for passing through said through adjustment holes 55.

The head 62 of the threaded pins 61 is suitable for cooperating with the command and regulation surface 53, so as to transmit the forces to the positioning means.

If necessary, the threaded pins 61 are suitable for cooperating with the through adjustment holes 55 to implement said reciprocal movement of the two wedge elements 51.

In one embodiment, the wedge element 51, wherein the head 62 of the threaded pin 61 does not operate, comprises a locking element suitable for cooperating with the threaded pin 61, e.g., a bolt, or a washer, suitable for performing the same task as the thread in the through adjustment hole 55.

In an embodiment variation, the wedge element 51, wherein the head 62 of the threaded pin 61 does not operate, has larger dimensions than its counterpart in such a way as to permit a thread of larger dimensions, which is therefore suitable for withstanding the tear forces caused by the interaction with the thread of the threaded pin 61.

In a preferred embodiment, a positioning hollow 15 is provided, so as to allow the positioning of a threaded pin 61 arranged on the central surface 13 of one of the two gibs 10, or both the gibs 10

The number of positioning hollows 15 will be the same as the number of the threaded pins 61.

In a preferred embodiment, the two gibs 10 have the same shape, in other words the two gibs 10, facing one another, are mirrored the one to the other.

In a preferred embodiment, the wedge elements 51 housed in different compartments 5 also have interaction surfaces 52 of the same shape. Preferably said shape is pointed, e.g., in section view it has a triangular shape, rather than trapezoidal, or again, rounded, hemispheric or spherical.

In further embodiment variations said shape is instead generally polygonal.

In a preferred embodiment, the device 1 also comprises locking means 80 suitable for keeping together the various components comprised in the device 1, preferably in a package.

In particular, the locking means 80 are suitable to keeping together the two gibs 10 positioned the one in front of the other.

Thanks to the locking means 80, the two gibs 10 are kept as close as possible together.

The locking means 80 comprise an elastic element 81 suitable for being positioned, preferably in tension, on both the gibs 10.

Preferably, each gib 10 has at least one protrusion 18.

More specifically, the gib 10 comprises two lateral surfaces 14, at its extremities; said protrusion 18 is obtained on one of said lateral surfaces 14.

In a preferred embodiment variation, each gib comprises at least two protrusions 18 per lateral surface 14; consequently, the elastic element 81 extends around four protrusions 18 of two gibs 10 facing each other.

In a preferred embodiment are comprised two elastic elements 81 per device.

With reference to the attached illustrations, and in particular to the FIGS. 2, 2a, 2b, 3 and 4, by the reference number 500 is indicated a support, in turn a subject of the present invention, in some of its preferred embodiments.

The support 500 is suitable for supporting a plate 100 on a generic surface.

In a preferred embodiment, the support 500 is C shaped or U shaped and is suitable for being rested, fitted and fastened against a surface.

Preferably, such embodiment of the support 500 is obtained by means of a single profile section or by means of the joining of several profile sections.

In a preferred embodiment, the support 500 comprises a base 501, suitable for resting against the surface.

Preferably, the support 500 comprises two wings 502, starting from said base 501. Said wings 502 together identify a cavity 550. The plate 100, and in particular the plate foot 104, is suitable for being housed in said cavity 550.

In one embodiment, the cavity 550 is suitable for also containing, in addition to the plate 100, at least one of said regulation and/or locking devices 1.

Preferably, on each face 101, 102 of the plate 100, at least one device 1 can be positioned.

The number of devices 1 along a face 101, 102 of a plate will vary according to the dimensions of said plate 100, and therefore of the relative support 500.

Preferably each device 1 acts on a face of the plate 100 and on a wing 502.

In other words a device 1 has a gib 10 with the respective support surface 11 resting on the plate 100 while the other gib 10 has the respective support surface resting on the support 500, preferably on the wing 502.

In a preferred embodiment, the support 500 also comprises a plate rest 560 suitable for providing a sturdy support for the plate foot 104; in addition, in the case of a number of embodiment variations, the plate rest 560 is also suitable for favouring the rotation of the plate 100.

More specifically, in the base 501 is obtained a specific secondary cavity 551 suitable for containing the plate rest 560.

Preferably, the secondary cavity 551 extends along the entire base 501.

In particular, the secondary cavity 551 is suitable for containing the plate rest 560 and faces onto the cavity 550.

Preferably, the plate rest 560 has an undercut 561 suitable for containing the plate 100; preferably, it is suitable for containing plates of different sizes, e.g., of different thicknesses.

In a preferred embodiment, the undercut 561 has the same dimensions as the thickness of the plate 100 so that the edges of the undercut cooperate with the faces 101, 102. In a further embodiment, the undercut 561 has further undercuts 561' inside it in such a way as to be able to contain plates with smaller dimensions, thicknesses.

In an embodiment variation, the secondary cavity 551 has a rounded shape suitable for allowing the rotation of the plate rest 560 inside it.

In an embodiment variation, the secondary cavity 560 has a substantially round shape, e.g., of a circular sector rather than a semi-spherical sector or again of an even greater angle.

Preferably, the plate rest 560 has a substantially cylindrical shape, so that it is rotatable. The plate rest 560, in fact, comprises a sliding surface 562 suitable for resting in the secondary cavity 551 and sliding in it rotationally.

Figures 1, 1A, 1B, 1C, 1D:
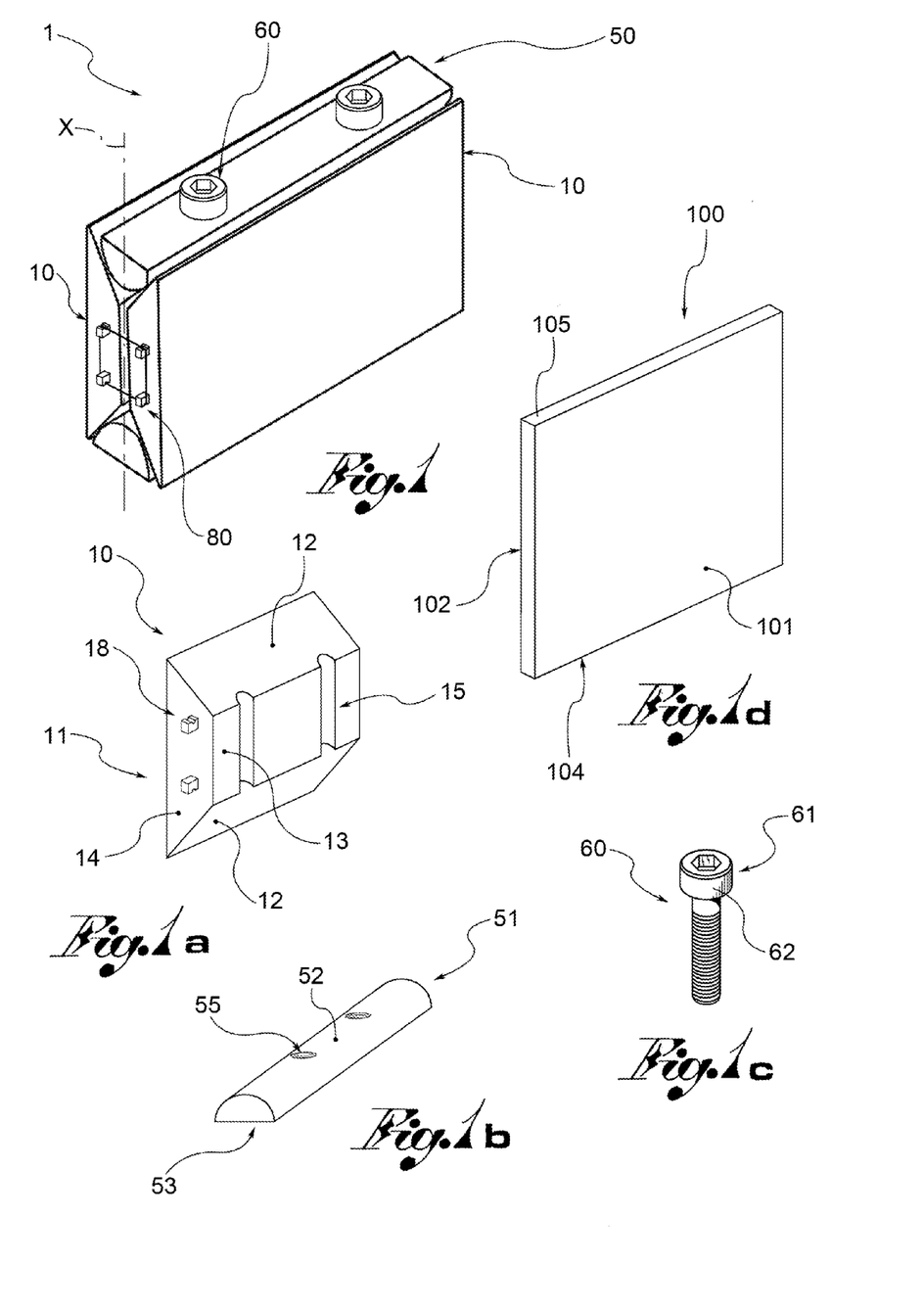
Figure 2:
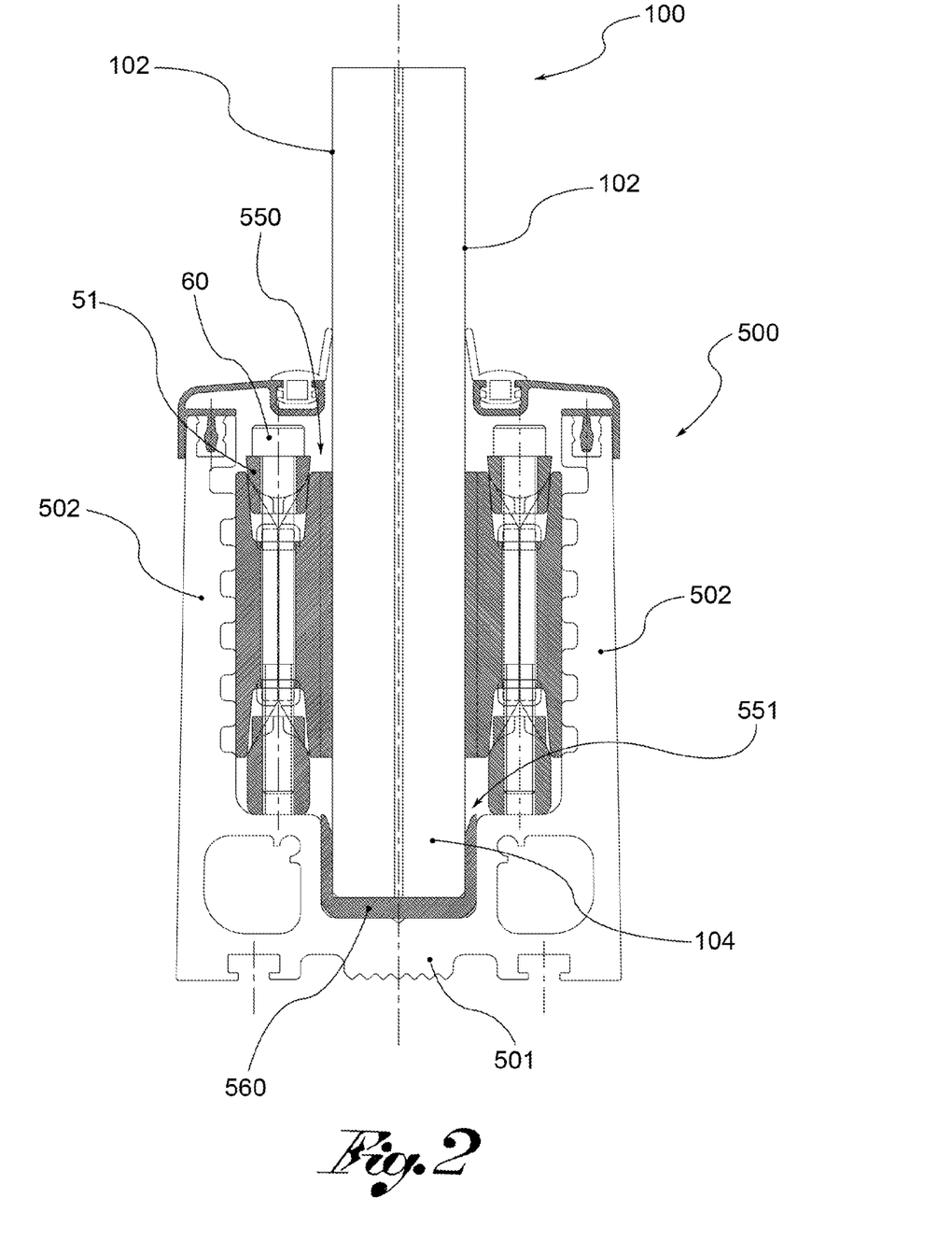
Figure 2A:
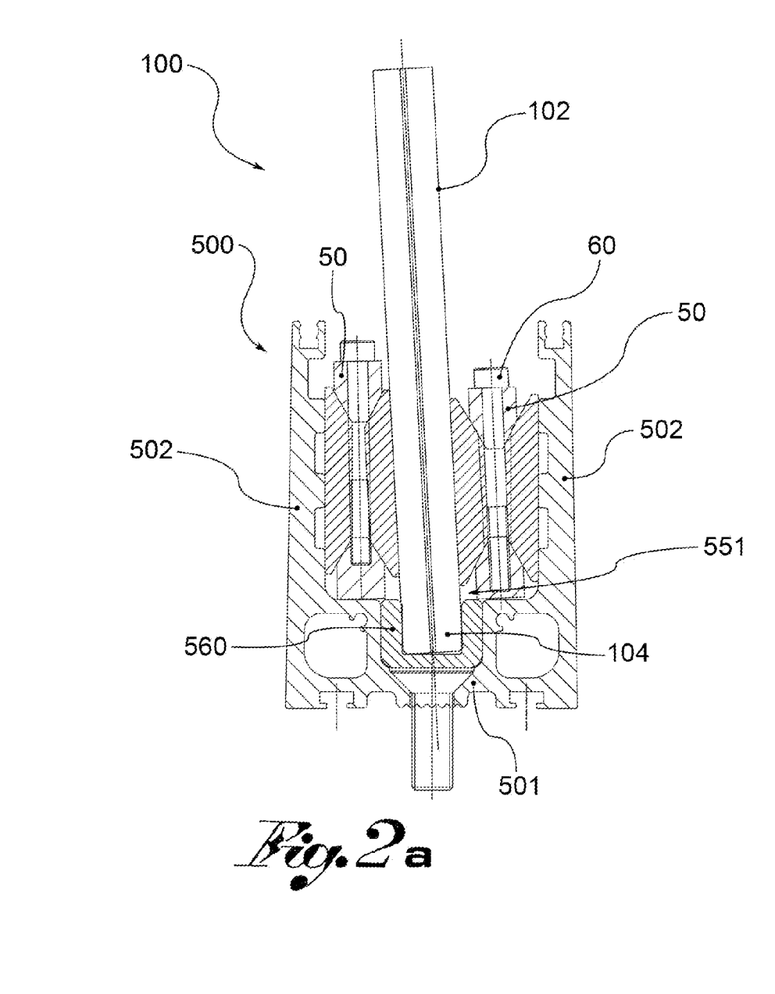
Figure 2B:
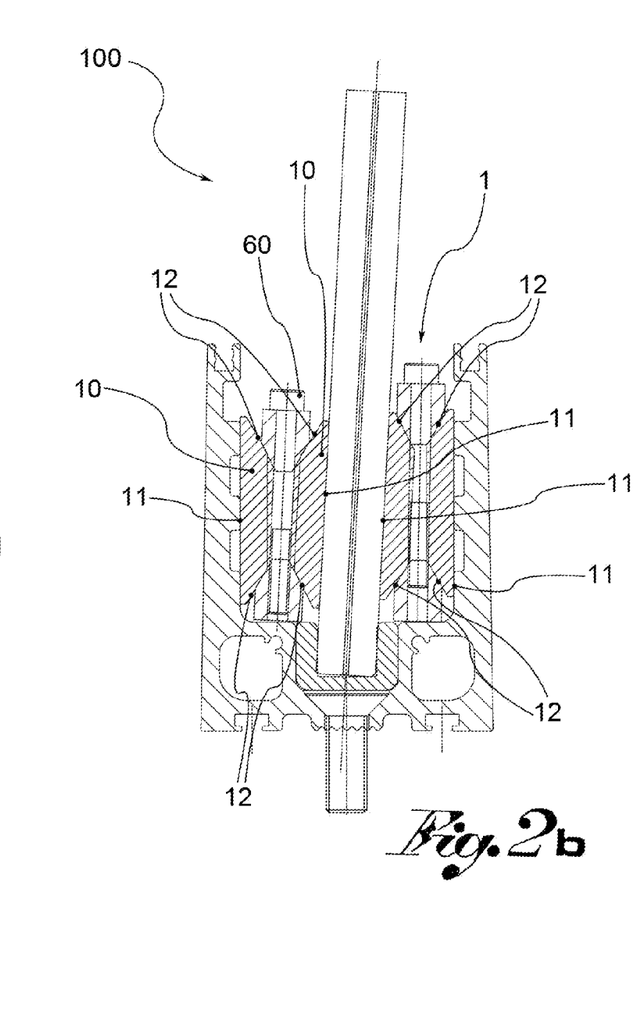

In a preferred embodiment, the inclination of the plate 100 is regulated and kept in said position over time by means of the support 500.

In particular, by means of the support 500, the plate 100 can be regulated and locked in a predefined, preferred position.

For example, by means of the support 500, the plate can be positioned and regulated according to the following method; the method comprises the phases of:

loosening the command means 60 of each device 1, so that the wedge elements 51 are not tightened on the respective gibs 10;

moving the plate 100, rotating it, so that it turns in the cavity, in particular in the secondary cavity 551, as far as the predefined position; this way, the various gibs 10 are arranged in such a way as to maintain contact with the plate and with the fixed element;

tighten the command means 60 in such a way that the wedge elements 51 come closer to one another, pushing the gibs 10; the gibs 10 tend to move away from one another in such a way as to apply thrust forces on the one side on the wing 502 and on the other side on the plate 100 which is therefore locked in such position.

Figure 3:
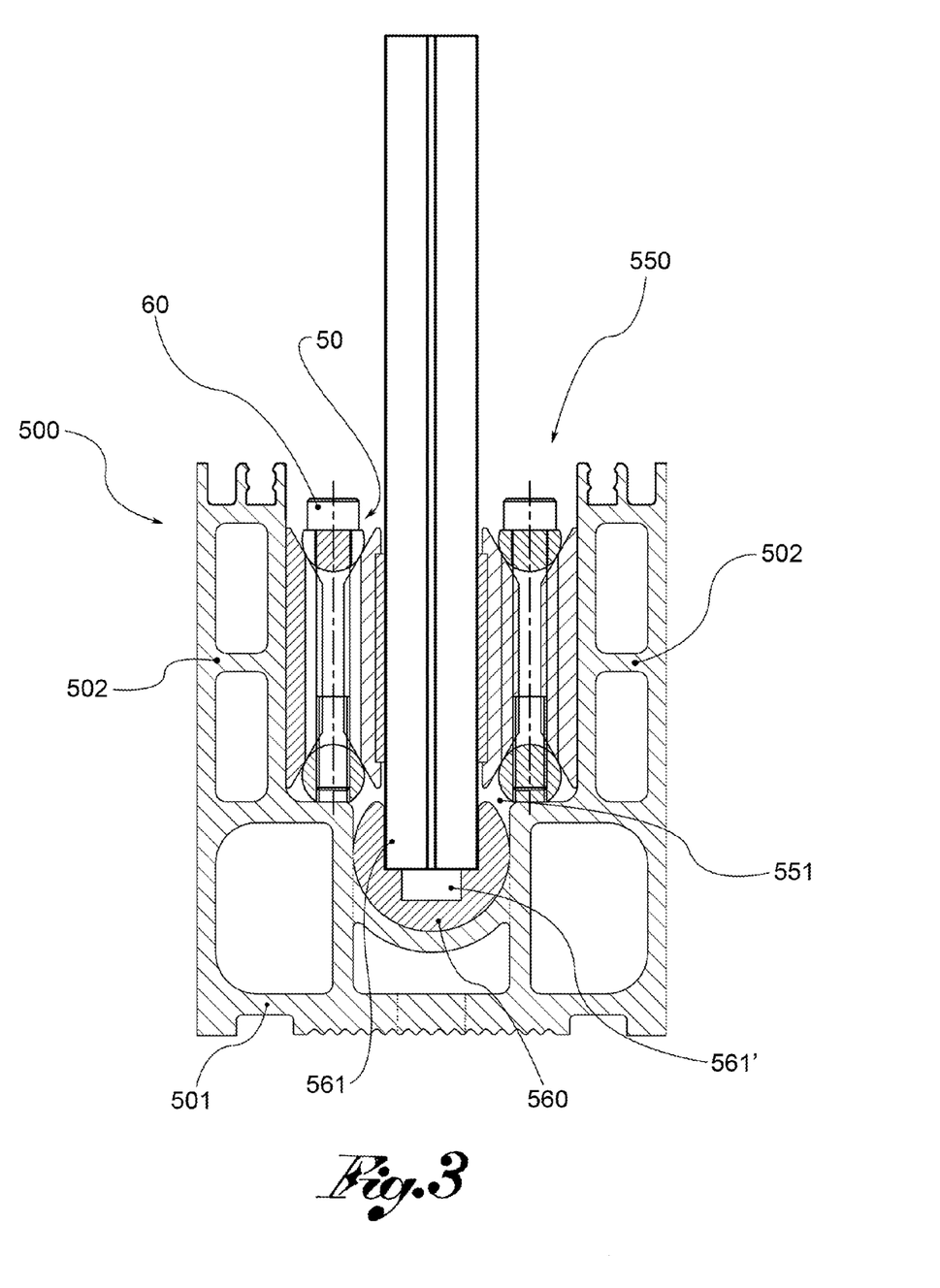
Figure 4:
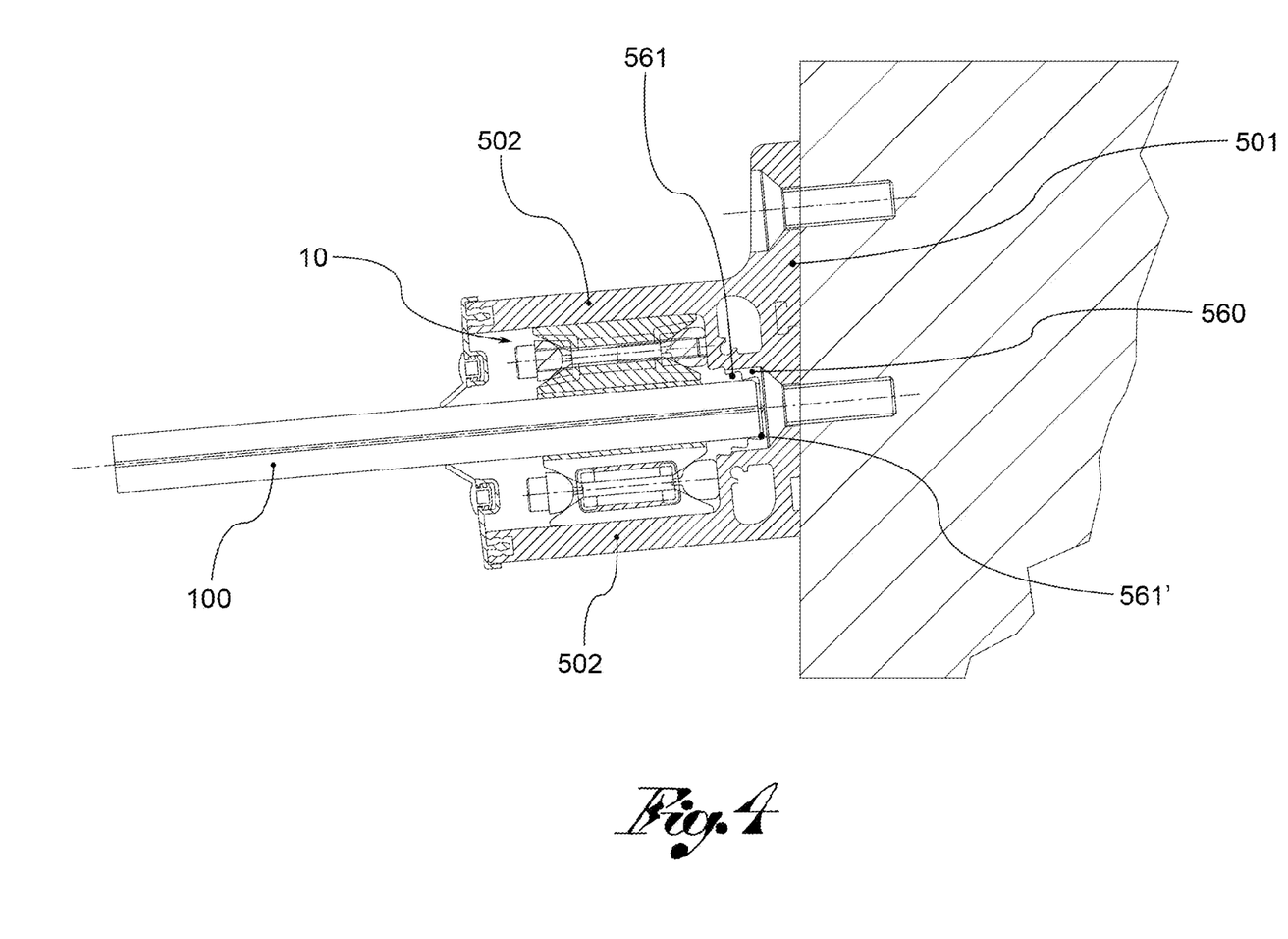

In one embodiment variation, the two wings 502 of the support 500 extending themselves from the base 501 extend themselves perpendicular to the surface against which the support 500 is rested or fastened, or in a substantially perpendicular manner, or inclined; in the same way, the cavity 550 identified by the two wings will also extend in a substantially perpendicular way, or inclined with respect to the surface against which the support 500 is rested or fastened.

In such embodiment variation, the support 500 itself appears already inclined with respect to the surface on which it is placed.

Innovatively, the regulation and/or locking device forming the subject of the present invention permits a simple locking and a simple regulation of a plate.

Advantageously, the device is extremely performing inasmuch as it has an entire area, the support surface, suitable for transmitting the locking force to the plate. This way, the forces involved lock the plate in an accurate way, discharging the forces on the plate in the best possible way; this way even large-size plates can be locked.

Advantageously, compared to the devices of the state of the art, the device has a simple construction and is easy to make and assemble.

Advantageously both the simple construction of the device and the fact that it has an entire surface to transmit the forces to the plate, makes possible the production of a miniaturization of it.

Advantageously, the locking forces are due to the interaction between the gibs and the positioning means; this way, different embodiments can be designed according to need; for example, by changing the inclination angles or the shape of the wedge elements.

In further embodiments, the wedge elements have more complex shapes, e.g., they have ribs and reinforcement areas. Any elements of this type can be accommodated inside the gibs on which specific complementary elements are designed and created.

Advantageously, the gibs are also conceived in such a way as to always adhere with the support surface to the plate or to the fixed element; for example, devices can be easily designed suitable for resting on curved plates or with particular shapes, maintaining the elements illustrated above.

Advantageously the gibs are suitable for arranging themselves, following the inclination of the plate, in such a way as to always keep the respective support surfaces resting on the plate or on the fixed element.

For example, one gib will keep the support surface resting on the fixed element, while the other gib will incline in such a way as to keep its support surface resting on the respective face of the plate.

Advantageously therefore, the regulation and/or locking device adjusts itself, with respect to the movement, rotation, of the inclined plate on which it operates. In other words, the regulation and/or locking device adapts its spatial position according to needs, according to the required plate position.

Advantageously, the operator positions the plate in a predefined position, e.g., inclined, and operating on the command means, locks the regulation and/or locking device, which has, on its own, taken up a position in agreement with the position of the plate, in the above position.

Innovatively, the support containing the device is suitable for containing, regulating and locking plates of different shapes and sizes maintaining compact measurements.

Advantageously in fact, the support is suitable for containing a plate, preferably a plate foot, and at least a regulation and/or locking device per face.

Advantageously, the support is suitable for containing plates of different thicknesses, in particular thanks to the fact that the devices are easily adjustable on site and in particular by virtue of the fact that the devices are self-adjusting in agreement with the positioning of the plate in a predefined position.

Advantageously, furthermore, the reciprocal distance of the gibs of a device is easily adjustable by means of the command means in such a way as to lock the plates of different thicknesses.

Advantageously, the plate is adjustable in position by the fitter, by making it turn manually in the support.

Advantageously, the fitter can position the plate in a position substantially perpendicular to the surface on which the support is rested or fastened, but also perfectly perpendicular, or sloping with respect to this, depending on the requirements it has. For example, two consecutive plates can be aligned whatever the inclination of the surface, which can even be uneven, e.g., in turn inclined.

Advantageously, the support can be used as a support for a balustrade, and as a support for a projecting roof.

Advantageously, the support, in some embodiments, is inclined with respect to the surface on which it rests or is fastened.

Advantageously, depending on the use of the support, the base, and if necessary the wings, require minimum design changes, while the devices always remain the same.

Advantageously, the regulation and locking operation is extremely fast and can be simply performed by the fitter.

Advantageously, both the gibs and the positioning means are obtainable by simple pressing production cycles.

Advantageously, both the gibs and the positioning means can be in aluminium, or in nylon, or in glass fibre reinforced nylon.

A technician in the field could modify the embodiments of the above device and of the above support in order to satisfy specific requirements.

These variations too remain within the protection scope as defined by the following claims.

In further embodiments, spacers are fitted on the devices; said spacers are preferably positioned, and/or fastened on the support surfaces of a gib or of both gibs, so as to better interact with plate or fixed elements.

For example, said spacers are made of material softer than metal, e.g., rubber or plastic, so as to cooperate with the glass plate without any risk of spoiling it.

In further embodiment variations, the supports also comprise covering panels and seals, suitable for protecting the support and the contained devices from atmospheric agents.

For example, between the wings and the plate, seals are positioned; the seals are preferably fastened on the wings and extend until they interact with the plate.

Furthermore, in some embodiment variations, the plate rest is made of a yielding material so as to provide a gentle support for the plate and the possibility of adjusting its angular inclination.

In some embodiments, gibs are provided, different from one another inside the same device; in particular, in the same device, the gibs can have positioning surfaces different from one another, both in the same gib and with respect to one another, so that different forces can be discharged and transmitted through the gibs to the plate or the supports.

Furthermore, each variation described as belonging to a possible embodiment can be made irrespective of the other variations.

The invention claimed is:

1. Regulation and/or locking device of a plate, suitable for cooperating with a side of said plate so as to adjust and/or lock the plate in a predefined position with respect to a fixed element, comprising:
    two gibs facing each other, wherein each gib comprises a support surface, positioned outwards and suitable for resting on a respective side of the plate or of a fixed element, and positioning surfaces, inclined with respect to the support surface;
    positioning means for interacting with the positioning surfaces of the two gibs, in such a way as to move their position locking the plate;
    control means maneuverable for activating the positioning means;
    wherein each gib comprises two positioning surfaces positioned outwards and inclined, in an opposite direction to each other, in such a way that two compartments are created, opposite each other, between the two opposite gibs.

2. Device according to claim 1, wherein the positioning means, housed in said compartments, interact at the same time on each positioning surface of both gibs of the regulation and/or locking device.

3. Device according to claim 1, wherein the positioning means comprise at least one wedge element comprising at least one interaction surface suitable for interacting on the respective positioning surfaces of both gibs.

4. Device according to claim 1, wherein the interaction surface is inclined.

5. Device according to claim 4, wherein the control means are suitable for moving, at the same time, the wedge elements in respective compartments, moving the wedge elements closer to or further away from each other respectively.

6. Device according to claim 1, further comprising locking means suitable for holding the two facing gibs together.

7. Device according to claim 6, wherein the locking means comprise an elastic element suitable for acting in conjunction with the two gibs.

8. Device according to claim 6, wherein each gib comprises protrusions on which the locking means are placed and with which the locking means interact so as to perform said locking.

9. Regulation and/or locking device of a plate, suitable for cooperating with a side of said plate so as to adjust and/or lock the plate in a predefined position with respect to a fixed element, comprising:
    two gibs facing each other, wherein each gib comprises a support surface, positioned outwards and suitable for resting on a respective side of the plate or of a fixed element, and positioning surfaces, inclined with respect to the support surface;
    positioning means for interacting with the positioning surfaces of the two gibs, in such a way as to move their position locking the plate;
    control means maneuverable for activating the positioning means;
    wherein the positioning means comprise at least one wedge element comprising at least one interaction surface suitable for interacting on the respective positioning surfaces of both gibs; and
    wherein the wedge elements comprise threaded through adjustment holes and the control means comprise threaded pins suitable for interacting with the threaded adjustment holes of two opposite wedge elements.

10. Support suitable for supporting a plate in relation to a surface, comprising a base, suitable for resting against said surface, and two wings, which extend from said base, identifying a cavity suitable for containing said plate and at least one regulation and/or locking device according to claim 1.

11. Support according to claim 10, comprising at least one regulation and locking device for each side of the plate.

12. Support according to claim 10, suitable for containing and locking, by locking devices a plate in a predefined position, perpendicular to the surface against which the support is rested or fastened, or substantially perpendicular, or inclined.

13. Support in agreement with claim 10, wherein the two wings, which extend from base perpendicular to the surface against which the support is rested or fastened, or substantially perpendicular, or inclined.

* * * * *